US004001594B2

United States Statutory Invention Registration [19]

[11] Reg. Number: H1594

[45] Published: Sep. 3, 1996

Sekiya et al.

[54] SILVER HALIDE COLOR PHOTOGRAPHIC LIGHT-SENSITIVE MATERIAL

[75] Inventors: Tadanobu Sekiya; Sadayasu Ishikawa, both of Hino, Japan

[73] Assignee: Konica Corporation, Tokyo, Japan

[21] Appl. No.: 130,360

[22] Filed: Oct. 1, 1993

[30] Foreign Application Priority Data

Oct. 6, 1992 [JP] Japan ..... 4-290886

[51] Int. Cl.[6] ..... G03C 1/46

[52] U.S. Cl. ..... 430/506; 430/567; 430/569

[58] Field of Search ..... 430/503, 506, 430/567, 569

[56] References Cited

U.S. PATENT DOCUMENTS

| | | | |
|---|---|---|---|
| 4,820,624 | 4/1989 | Hasebe et al. | 430/567 |
| 4,968,595 | 11/1990 | Yamada et al. | 430/567 |
| 5,037,728 | 8/1991 | Shiba et al. | 430/567 |

FOREIGN PATENT DOCUMENTS

| | | |
|---|---|---|
| 421740 | 4/1991 | European Pat. Off. . |
| 480294 | 4/1992 | European Pat. Off. . |
| 2206974 | 1/1989 | United Kingdom . |

*Primary Examiner*—Charles T. Jordan
*Assistant Examiner*—J. R. Hardee
*Attorney, Agent, or Firm*—Bierman and Muserlian

[57] ABSTRACT

A silver halide color photographic light-sensitive material is provided, wherein at least one spectral-sensitive layer comprises two or more silver Halide emulsion layers each containing monodispersed silver halide grains having two parallel twin planes and an aspect ratio of 3 or less, having development starting points localized at specific sites on the grain surface or in the vicinity thereof.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR PHOTOGRAPHIC LIGHT-SENSITIVE MATERIAL

FIELD OF THE INVENTION

The present invention relates to a silver halide color photographic light-sensitive material having low processing variability and offering excellent color reproduction, particularly a high interimage effect (hereinafter referred to as IIE).

BACKGROUND OF THE INVENTION

In recent years, there has been an increasing trend toward higher image quality with the marked improvement in the image quality offered by silver halide color photographic light-sensitive materials.

Meantime, since the development of photographic processing systems of relatively small scale known as mini-laboratories, there have been increasing cases where photographic materials are processed at retail shops such as photo shops. These small-scale processing laboratories undergo more difficulties in processing management than do large-scale processing laboratories. Accordingly, there is a need for the development of color photographic light-sensitive materials of reduced processing variability.

With respect to such processing variability, attempts have been made to improve processing solutions to increase processing stability, but no satisfactory effects have been obtained. From the viewpoint of improvement of silver halide color photographic light-sensitive materials, some methods have been proposed which are based on the concept of equalizing the developing speeds in respective emulsion layers.

For example, to equalize the developability of silver halide grains in a layer of higher sensitivity to that in a layer of lower sensitivity within the same spectral sensitivity, the grain size of silver halide grains in the layer of higher sensitivity is decreased, or a layer of relatively low silver iodide content or a layer having an appropriate silver chloride content is formed on the surface of the grains. However, grain size reduction or change in a halide content results in a loss of sensitivity and deterioration of granularity. Also, silver iodide content reduction generally results in deteriorated color reproduction because IIE decreases.

Also, it is a well-known approach to improvement in color reproduction to add a DIR compound to the color light-sensitive material. However, this method has a drawback that increasing the amount of addition results in significant loss of sensitivity or color reproducibility. Another drawback is that processing stability is deteriorated as a result of accumulation of the developing inhibitor released in the processing solution.

The same tendency, though varying in degree, was seen even when using a DIR compound which loses its suppressive action upon release in the developer.

In these circumstances, the present inventors concluded that silver halide grains themselves should be improved to obtain a color light-sensitive material having suppressed processing variability and high IIE (Inter-image effect) while maintaining a good balance between sensitivity and granularity.

The present inventors first marked emulsions of tabular grains of high aspect ratio, which offer relatively high developing speed and are therefore advantageous form the viewpoint of sensitivity. The inventors prepared emulsions comprising grains whose silver halide composition is varied therein to increase IIE, i.e., emulsions based on a combination of tabular twin crystal grain technology and core-shell grain technology as described in Japanese Patent Examined Publication No. 38692/1988 and Japanese Patent Publication Open to Public Inspection (hereinafter referred to as Japanese Patent O.P.I. Publication) No. 14636/1986, and tabular twin crystal emulsions wherein a layer of relatively high silver iodide content is formed on the grain surface as described in Japanese Patent O.P.I. Publication No. 284848/1989, and compared their photographic performances. Although IIE improved, granularity deteriorated significantly probably because of the wider grain size distribution than in normal crystal emulsions, with almost no improvement in processing variability.

With this in mind, the inventors prepared a monodispersed emulsion of low aspect ratio having two mutually parallel twin crystal planes, as described in Japanese Patent O.P.I. Publication No. 163433/1991, and evaluated its photographic performance in each of the emulsion layers of the same spectral sensitivity. Although processing variability was successfully improved without deterioration of sensitivity or granularity, no sufficient IIE was obtained.

The present inventors then studied to improve IIE alone in such a monodispersed emulsion comprising grains of low aspect ratio having two mutually parallel twin crystal planes, and found that the essential object can be accomplished when each of the emulsion grains has a development starting point near the intersection of a line formed by a twin crystal plane exposed to the grain surface and a edge of the grain.

SUMMARY OF THE INVENTION

The object of the present invention to provide a silver halide color photographic light-sensitive material having suppressed processing variability and high IIE while maintaining a good balance between sensitivity and granularity.

The above object of the present invention is accomplished by the following constituents.

A silver halide color photographic light-sensitive material having on its support a red-sensitive layer, a green-sensitive layer and a blue-sensitive layer, at least one of which layers comprises two or more silver halide emulsion layers of different sensitivities, wherein at least one color-sensitive layer contains two or more emulsion layers each containing a silver halide emulsion meeting all the following requirements (i), (ii) and (iii):

(i) a monodispersed emulsion, (ii) an emulsion containing silver halide grains having two mutually parallel twin crystal planes and an average aspect ratio of lower than 3.0, (iii) some or all of development starting points of the grains constituting the emulsion locating near the intersection of a line formed by a twin crystal plane exposed to the grain surface and a edge of the grain.

Figure 1:
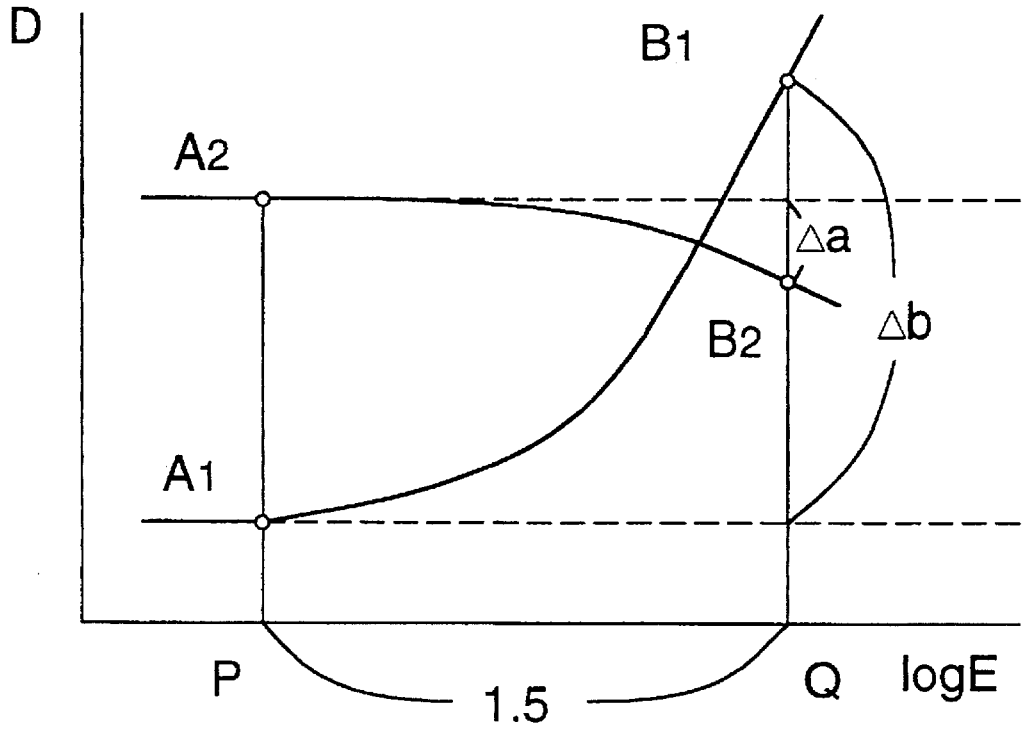
FIG. 1 is a graph for calculating IIE, wherein the numerical symbols have the following definitions.

$A_1$, $B_1$: Cyan dye image density $A_2$, $B_2$: Magenta dye image density

P: Exposure amount

Q: Exposure amount corresponding to P+1.5

D: Density logE: Logarithmic exposure amount

DETAILED DESCRIPTION OF THE INVENTION

The present invention is hereinafter described in detail.

The term "monodispersed" used herein is defined to be not higher than 30%, preferably not higher than 20% in the coefficient of variation. Here, the coefficient of variation is obtained by dividing the dispersion (standard deviation) of grain diameter by average grain diameter. Grain diameter is defined as the diameter of a circle having an area equal to the projected area of a silver halide grain under microscopic observation. The average grain diameter is obtained by dividing the total value for the diameters of all grains in the emulsion by the total number of the grains.

The term aspect ratio used herein is the ratio of silver halide grain diameter to thickness, obtained by the equation: aspect ratio= grain diameter/grain thickness. "An emulsion containing silver halide grains having two mutually parallel twin crystal planes and an aspect ratio of lower than 3.0" means that such grains account for not lower than 60%, preferably not lower than 70% by number of all grains.

In the present invention, it is necessary to determine the site at which development begin on the grain (hereinafter referred to as "development starting point".

"A development starting point" is recognized as such by observation after developing and stopping thereof. Specifically, it can be determined as follows:

To determine the development starting point on a grain, a light-sensitive material having on its support a photographic emulsion is processed as follows:

The light-sensitive material is subjected to exposure through an optical wedge and then processed in a conventional manner to obtain its characteristic curve. The light-sensitive material is subjected in an amount of 10 times a minimal exposure amount required to obtain the maximum density. After this exposure, both light-sensitive material exposed are developed with a developer having substantially the same composition. After initiation of the development, the light-sensitive material is immersed in a 3% acetic acid solution to stop the development.

Developing conditions (e.g., temperature, time, processing solution concentrations) for determining the development starting point can be chosen as appropriate to facilitate observation of the development starting point.

The present invention is characterized in that some or all of the above-described silver halide grains having two mutually parallel twin crystal planes and an aspect ratio of lower than 3.0 have a development starting point near the intersection of a line formed by a twin crystal plane exposed to the grain surface and a edge of the grain (this area is referred to as cross area).

Here, "some or all" means that when twin crystal grain development starting points are observed by the above-described methods of exposure and development, at least 70% of the development starting points are present in the cross area. Preferably, not less than 80% of development starting points are present in the cross area.

"A line formed by a twin crystal plane exposed to the grain surface" is easily identifiable from the grain morphology when the twin crystal plane forms a clear edge on the grain surface, e.g., in the case of grains having only one twin crystal plane. However, even in the case of a twin crystal plane which forms apparently no edges on the grain surface as in the case where the grain has two mutually parallel twin crystal planes, the line is easily identifiable by observing the grain by high-resolution scanning electron microscopy at low acceleration voltage. For this reason, "a line formed by a twin crystal plane exposed to the grain surface" include both of the above cases.

"Near the intersection of a line formed by a twin crystal plane exposed to the grain surface and a edge of the grain" mean the intersection of a line formed by a twin crystal plane exposed to the grain surface and a edge of the grain, and the vicinity thereof. The vicinity is defined to be within the sphere whose radius is ⅓, preferably ¼ of the grain thickness and whose center is the above-described intersection (hereinafter called as cross area center). More preferably, the radius is ⅕ of the grain thickness, whereby the desired effect is enhanced.

"Edges and corners of a grain" mentioned herein are sites which are crystallographically identifiable substantially as edges or corners.

In determining the development starting point of a grain in the present invention, it is recommended to use a high-resolution scanning electron microscope at low acceleration voltage as in the observation of a line formed by a twin crystal plane exposed to the grain surface. Sample observation may be conducted under cooling conditions as necessary, whereby better results are obtained because electron beam damage to the silver halide grain is reduced. On the other hand, transmission electron microscopy offers mostly two-dimensional information on tabular grain development starting points; three-dimensional information is difficult to obtain. It is of no use also because lines formed by exposed twin crystal planes are difficult to identify.

Although Japanese Patent O.P.I. Publication Nos. 305343/1988 and 77047/1989 disclose an art wherein the development starting point of a tabular grain is located on or near a edge or corner thereof, the information obtained thereby is substantially two-dimensional with respect to the development starting point of the tabular grain. In other words, either publication does not state whether the development starting point is present on or near a line formed by a twin crystal plane exposed to the grain surface. In this regard, the present invention is characterized by more precise determination of development starting points, offering improved IIE, as well as improved sensitizing effect and developing stability.

In the present invention, to control development starting points to fall in the scope of claims, the following technology is necessary.

That is, at least part of the process for silver halide grain formation should be carried out in the presence of an oxidant (or oxidizing agent), and/or an emulsion comprising fine silver halide grains should be added during formation of the outermost layer of the silver halide grains.

The oxidant relating to the present invention is a compound capable of converting metallic silver to silver ion. A compound which converts very minute silver atoms produced during silver halide grain formation to silver ions, in particular, is effective.

Halogen elements are preferable oxidants for the present invention, with preference given to iodine.

In the present invention, the amount of oxidant added is preferably $10^{-7}$ to $10^{-1}$ mol, more preferably $10^{-6}$ to $10^{-2}$ mol, and still more preferably $10^{-5}$ to $10^{-3}$ mol per mol of silver.

The oxidant may be present in the reaction vessel before grain growth, or may be added at any time point from the start of grain growth to desalinization.

When the oxidant for the present invention is added during the emulsion production process, conventionally used methods for addition of additives to photographic emulsions can be used. For example, the oxidant may be added in an appropriate concentration of aqueous solution, or in a solution in an appropriate water-miscible organic solvent which does not adversely affect photographic performance, such as an alcohol, a glycol, a ketone, an ester or an amide. The oxidant may also be added in a solid form directly to the emulsion. The oxidant may be added by rush addition, constant rate addition or functional addition.

The emulsion relating to the present invention, which comprises fine silver halide micrograins, is an emulsion wherein the average diameter of the micrograins, taken as true spheres, is not greater than 0.1 μm, preferably not greater than 0.07μ, and still more preferably not greater than 0.05 μ. Its halogen composition may be any one of silver iodochloride, silver iodobromide, silver bromide and silver chloroiodobromide.

With respect to the "emulsion layer containing a silver halide emulsion meeting all the following requirements (i), (ii) and (iii)" as described in the scope of claims of the present invention need not always be composed solely of a silver halide emulsion meeting all requirements (i), (ii) and (iii), implying that said emulsion may be used in combination with other emulsions which fail to meet one or more or all of requirements (i), (ii) and (iii). However, the ratio of the emulsion relating to the present invention to non-inventive emulsions in the emulsion layer relating to the invention is preferably not lower than 3/7, more preferably not lower than 1/1, and most preferably not lower than 3/2, as of silver weight.

The silver halide grains relating to the present invention preferably comprise a silver iodobromide having an average silver iodide content of 1 to 20 mol %, particularly 3 to 15 mol %. Also, silver chloride may be contained, as long as the desired effect of the present invention is not interfered with. Also, the silver halide grains used for the present invention preferably consist of at least two layers of different silver iodide contents, since this is favorable from the viewpoint of sensitivity and granularity. In this case, the maximum silver iodide content layer of the two or more layers is preferably a layer other than the grain surface layer.

In such core-shell type (or multi-layered) silver halide grains, the silver iodide content gradient from layers of higher silver iodide contents to those of lower silver iodide contents may be in steps separated by sharp borders, or may be continuous without clear borders. The silver iodide content of the outermost layer of the silver halide grains relating to the present invention is preferably not higher than 6 mol %, more preferably not higher than 4 mol % and still more preferably not higher than 2 mol %.

In the present invention, the silver iodide content of each silver halide grain and the average silver iodide content of silver halide grains can be obtained by the EPMA (electron probe microanalyzer) method. In this method, a sample is prepared by thoroughly dispersing emulsion grains to avoid mutual contact, and this method allows elemental analysis for smaller portions than in X-ray analysis based on electron beam excitation.

This method makes it possible to determine the halogen composition of each grain by determining the intensities of silver- and iodine-characteristic X-rays radiated from each grain. If the silver iodide contents of at least 50 grains are determined by the EPMA method, the average silver iodide content can be obtained from the mean thereof.

The emulsion of the present invention is preferably uniform as to grain-to-grain iodine content distribution. When the grain-to-grain iodine content distribution is determined by the EPMA method, relative standard deviation is preferably not higher than 35%, more preferably not higher than 20%.

The emulsion relating to the present invention is prepared in the presence of a dispersant, or in a solution containing a dispersant.

An aqueous solution containing a dispersant is an aqueous solution in which a protective colloid of gelatin or another substance capable of forming a hydrophilic colloid (e.g., binder substance) has been formed, and it is preferably an aqueous solution containing a protective gelatin in a colloid form.

When gelatin is used as such a colloid in carrying out the present invention, the gelatin may have been treated with lime or acid. Preparation of gelatin is described in detail by Arthur Veis in "The Macromolecular Chemistry of Gelatin", Academic Press, 1964.

Non-gelatin hydrophilic colloidal substances which can be used as protective colloids include gelatin derivatives, graft polymers of gelatin and other polymers, proteins such as albumin and casein, cellulose derivatives such as hydroxyethyl cellulose, carboxymethyl cellulose and cellulose sulfates, sugar derivatives such as sodium alginate and starch derivatives, and various synthetic hydrophilic homopolymers or copolymers such as polyvinyl alcohol, partially acetalized polyvinyl alcohol, poly-N-vinylpyrrolidone, polyacrylic acid, polymethacrylic acid, polyacrylamide, polyvinylimidazole and polyvinylpyrazole.

For gelatins, it is preferable to use a gelatin having a jelly strength, as determined by the PAGI method, of not lower than 200.

The silver halide emulsion of the present invention may be grown from a seed crystal, or may be grown via nucleation. Also, the silver halide emulsion may comprise grains of any form, whether cubic, octahedral, tetradecahedral, tabular or the like.

The silver halide emulsion prepared in the present invention may be of any one of silver iodochloride, silver iodobromide, silver chlorobromide and silver chloroiodobromide, with preference given to silver iodobromide because of high sensitivity.

In producing the silver halide emulsion relating to the present invention, a monodispersed emulsion can be prepared by adding a solution of a water-soluble silver salt and a solution of a water-soluble halide to a gelatin solution containing seed grains by the double jet method while controlling the pAg and pH. The addition rate can be determined with reference to Japanese Patent O.P.I. Publication Nos. 48521/1979 and 49938/1983.

To obtain a still more highly monodispersed emulsion, the method disclosed in Japanese Patent O.P.I. Publication No. 122935/1985, in which grains are grown in the presence of tetrazaindene, can be used.

In producing the silver halide emulsion relating to the present invention, pAg control during crystal growth is critical. The pAg during crystal growth is preferably 6 to 12. The pAg during silver halide formation may be constant, or may be changed in steps or continuously. When the pAg is changed, it is preferable to raise it as silver halide grains are formed.

In producing the silver halide emulsion relating to the present invention, stirring conditions are also critical. It is preferable to use the mechanical stirrer described in Japanese Patent O.P.I. Publication No. 160128/1987, which feeds an aqueous silver salt solution and an aqueous halide solution by the double jet method. at a rotation rate of 200 to 1000 rpm.

During preparation of the silver halide emulsion relating to the present invention, a known silver halide solvent such as ammonia, thioether or thiourea may be present or not.

The silver halide grains may be supplemented with metal ions using a cadmium salt, a zinc salt, a lead salt, a thallium salt, an iridium salt or a complex salt thereof to contain such metal elements in and/or on the grains during formation and/or growth thereof. Also, reduction sensitization specks can be provided in and/or on the grains by bringing the grains into an appropriate reducing atmosphere.

The silver halide grains may be grains wherein latent images are formed mainly on the surface thereof or grains wherein latent images are formed mainly therein, with preference given to silver halide grains having a size of 0.05 to 5.0 μm, preferably 0.1 to 3.0 μm.

The silver halide emulsion relating to the present invention may be treated to remove unwanted soluble salts after completion of silver halide grain growth, or may retain them. Removal of such salts can be achieved in accordance with the method described in term II, Research Disclosure (hereinafter abbreviated RD) No. 17643. More specifically, soluble salt removal from the emulsion after precipitation or physical ripening may be achieved by the noodle washing method, in which gelatin is used in a gel form, or by the flocculation method utilizing an inorganic salt, an anionic surfactant, an anionic polymer such as polystyrenesulfonic acid, or a gelatin derivative such as acylated gelatin or carbamoylated gelatin.

The silver halide emulsion relating to the present invention may be chemically sensitized by a conventional method. Specifically, sulfur sensitization, selenium sensitization, reduction sensitization, noble metal sensitization, which uses gold or another noble metal, and other sensitizing methods can be used singly or in combination.

The silver halide emulsion relating to the present invention may also be optically sensitized in the desired wavelength band using a sensitizing dye. Sensitizing dyes may be used singly or in combination. In addition to sensitizing dyes, non-spectral sensitizing dyes, and/or supersensitizers which are compounds having substantially no absorption of visible light and enhancing the sensitizing action of sensitizers may be incorporated in the emulsion.

The silver halide emulsion relating to the present invention may be supplemented with an antifogging agent, a stabilizer and other additives. It is advantageous to use gelatin as a binder for the emulsion. Emulsion layers and other hydrophilic colloidal layers may be hardened, and may contain a plasticizer and a dispersion (latex) of a water-insoluble or soluble synthetic polymer.

In the light-sensitive material of the present invention, at least one of color-sensitive layers comprises two or more silver halide emulsion layers different in sensitivity from each other. In the case of three or more emulsion layers different in sensitivity, the silver halide emulsion of the present invention is applicable to at least two of these layers.

The silver halide emulsion of the invention is applicable to any of color-sensitive layers, including blue-sensitive, green-sensitive and red-sensitive layers, or others such as a layer having negative spectral sensitivity. In a preferable embodiment of the invention, the inventive silver halide emulsion is employed in a green-sensitive or red-sensitive layer.

The emulsion layer of a color light-sensitive material incorporates a coupler. Also incorporatable are a competitive coupler having a color correcting effect, and a compound which releases a photographically useful fragment such as a developing accelerator, a developing agent, a silver halide solvent, a toning agent, a hardener, a fogging agent, an antifogging agent, a chemical sensitizer, a spectral sensitizer or a desensitizer, upon coupling with the oxidation product of a developing agent.

The light-sensitive material of the present invention may be provided with auxiliary layers such as a filter layer, an anti-halation layer and an anti-irradiation layer. These layers and/or emulsion layers may contain a dye which oozes out or becomes bleached from the light-sensitive material during processing.

The light-sensitive material of the present invention may incorporate a matting agent, a lubricant, an image stabilizer, a formalin scavenger, an UV absorbent, a brightening agent, a surfactant, a developing accelerator and a developing inhibitor.

Examples of supports which can be used for the present invention include polyethylene terephthalate films, paper laminated with polyethylene etc., baryta paper and triacetyl cellulose.

The light-sensitive material of the present invention can be color-developed by a common color developing process after exposure. In the reversal method, the light-sensitive material is first developed with a black-and-white negative developer, followed by white light exposure or immersion in a bath containing a fogging agent, after which it is color-developed with an alkaline developer containing a color developing agent.

Any processing method can be used without limitation. Typically, color development is followed by bleach-fixation and, where necessary, washing and stabilization, or color development is followed by bleaching and fixation and, where necessary, washing and stabilization.

Also, in the multiple-layered color photographic light-sensitive material of the present invention, various layer orders known to those skilled in the art, such as conventional layer order and inverted layer order, can be used.

EXAMPLES

The present invention is hereinafter described in more detail by means of the following examples, which are not to be construed as limitative. Example 1

Preparation of twin crystal seed emulsion T-I Seed emulsion T-1 comprising grains having two mutually parallel twin crystal planes was prepared as follows:

| Solution A | |
|---|---|
| Ossein gelatin | 80.0 g |
| Potassium bromide | 47.4 g |
| 10% methanol solution of sodium salt of polyisopropylene-polyethyleneoxy-disuccinate | 0.48 ml |

Water was added to make a total quantity of 8000.0 ml.

| Solution B | |
|---|---|
| Silver nitrate | 1200.0 g |

Water was added to make a total quantity of 1600.0 ml.

| Solution C | |
|---|---|
| Ossein gelatin | 32.2 g |
| Potassium bromide | 790.0 g |
| Potassium iodide | 70.34 g |

Water was added to make a total quantity of 1600.0 ml.

| Solution D | |
|---|---|
| Aqueous ammonia | 470.0 ml |

While vigorously stirring solution A at 40° C., solutions B and C were added by the double jet method over a period of 7.7 minutes to form nuclei. During this operation, a pBr of 1.60 was maintained. The temperature was then lowered to 23° C. over a period of minutes. Solution D was then added over a period of 1 minute, followed by 5 minutes of ripening. The KBr and ammonia concentrations during the ripening were 0.03 mol/l and 0.66 mol/l, respectively.

After completion of the ripening, the mixture was adjusted to pH 6.0 and then desalinized by a conventional method. Electron microscopy of these seed emulsion grains identified them as hexahedral tabular grains having two mutually parallel twin crystal planes.

These seed emulsion grains had an average grain size of 0.236 μm and a twin crystal plane ratio of 75% by number relative to the total number of grains.

Preparation of twin crystal seed emulsion T-2

Twin crystal seed emulsion T-2 was prepared in the same manner as for twin crystal emulsion T-1 except that the pBr was 1.80. These seed emulsion grains had an average grain size of 0.232 μm and a twin crystal ratio of 62% by number relative to the total number of grains.

Preparation of inventive emulsion EM-1

Using the following seven solutions, monodispersed emulsion EM-1 relating to the present invention, which comprised octahedral twin crystal grains having two mutually parallel twin crystal planes, was prepared.

| Solution A | |
|---|---|
| Ossein gelatin | 61.0 g |
| Distilled water | 1963.0 ml |
| 10% methanol solution of sodium salt of polyisopropylene-polyethyleneoxy-disuccinate | 2.5 ml |
| Seed emulsion T-1 | 0.343 mol |
| 28% by weight aqueous solution of ammonia | 308.0 ml |
| 56% by weight aqueous solution of acetic acid | 358.0 ml |
| Methanol solution containing 0.001 mol of iodine | 33.7 ml |

Distilled water was added to make a total quantity of 3500.0 ml.

Solution B 3.5 N aqueous solution of ammoniacal silver nitrate, adjusted to pH 9.0 with ammonium nitrate Solution C 3.5 N aqueous solution of potassium bromide

| Solution D | |
|---|---|
| Fine grain emulsion comprising 3% by weight gelatin and grains of silver iodide (average grain size 0.05 μm) | 1.40 mol |

This fine grain emulsion was prepared as follows:

To 5000 ml of a 6.0% by weight gelatin solution containing 0.06 mol of potassium iodide, 2000 ml of an aqueous solution containing 7.06 mol of silver nitrate and 2000 ml of an aqueous solution containing 7.06 mol of potassium iodide were added over a period of 10 minutes. During fine grain formation, a pH of 2.0 was maintained with nitric acid, and temperature maintained at 40° C. After grain formation, an aqueous solution of sodium carbonate was added to obtain a pH of 6.0.

| Solution E | |
|---|---|
| Fine grain emulsion comprising silver iodobromide grains having a silver iodide content of 2 mol % and an average grain size of 0.04 μm, prepared in the same manner as for the fine grain silver iodide emulsion prepared with solution D | 3.68 mol |

During fine grain formation, a temperature of 30° C. was maintained.

Solution F 1.75 N aqueous solution of potassium bromide

Solution G

56% by weight aqueous solution of acetic acid

To solution A being kept at 70° C. in a reaction vessel, solutions B, C and D were added by the triple jet precipitation method over a period of 128 minutes, followed by addition of solution E at constant rate over a period of 7 minutes, to grow the seed crystal until its size became 0.878 μm.

Solutions B and C were added at an appropriate rate changed as a function of time according to the critical rate of grain growth to prevent both the occurrence of small grains other than growing seed crystals and polydispersion due to Ostwald ripening. Supply of solution D, i.e., the silver iodide fine-grain emulsion, was performed while changing the flow rate ratio (molar ratio) of the emulsion to the aqueous solution of ammoniacal silver nitrate as a function of grain size (addition time), to prepare a multiple-layered core/shell type silver halide emulsion.

Also, by using solutions F and G, the pAg and pH during crystal growth were controlled as shown in Table 1. Determinations of pAg and pH were made in accordance with standard methods using a silver sulfide electrode and a glass electrode.

After grain formation, desalinization was performed in accordance with the method described in Japanese Patent Application No. 41314/1991, after which gelatin was again dispersed, and the dispersion was adjusted to pH 5.80 and pAg 8.06 at 40° C. Scanning electron micrographs of the obtained emulsion grains identified the emulsion as a monodispersed emulsion comprising octahedral twin crystals having an average grain size of 0.878 μm and a distribution width of 12.0%. As for aspect ratio, 95% grains had an aspect ratio of not higher than 2.0, the number-average aspect ratio (hereinafter referred to as average aspect ratio) being 1.6.

TABLE 1

| | Addition time (min) | Grain size (μm) | Solution D flow rate ratio | pH | pAg |
|---|---|---|---|---|---|
| Layer 1 | 0.0 | 0.236 | 6.0 | 7.2 | 7.8 |
| | 26.20 | 0.376 | 20.1 | 7.2 | 7.8 |
| | 40.86 | 0.429 | 29.5 | 7.2 | 7.8 |
| Layer 2 | 41.57 | 0.432 | 30.0 | 7.2 | 7.8 |
| | 54.11 | 0.473 | 30.0 | 7.2 | 7.8 |
| | 64.89 | 0.507 | 30.0 | 7.2 | 7.8 |
| Layer 3 | 67.98 | 0.518 | 28.9 | 7.2 | 7.8 |
| | 96.53 | 0.646 | 7.7 | 7.2 | 7.8 |
| | 96.53 | 0.646 | 0.0 | 6.5 | 9.4 |
| | 126.33 | 0.795 | 0.0 | 6.5 | 9.7 |
| | 128.00 | 0.811 | 0.0 | 6.5 | 9.7 |

Preparation of inventive emulsion EM-2

Monodispersed emulsion EM-2 relating to the present invention, which comprised octahedral twin crystal grains having two mutually parallel twin crystal planes, was prepared in the same manner as for emulsion EM-1.

| Solution H | |
|---|---|
| Ossein gelatin | 33.8 g |
| Distilled water | 1750.7 ml |
| 10% methanol solution of sodium salt of polyisopropylene-polyethyleneoxy-disuccinate | 2.5 ml |
| Seed emulsion T-1 | 1.719 mol |
| 28% by weight aqueous solution of ammonia | 308.0 ml |
| 56% by weight aqueous solution of acetic acid | 358.0 ml |
| Methanol solution containing 0.001 mol of iodine | 33.7 ml |

Distilled water was added to make a total quantity of 3500.0 ml.

To solution H being kept at 60° C. in a reaction vessel, solutions B, C and D were added by the triple jet precipitation method at an appropriate rate changed as a function of time in the same manner as for emulsion EM-1 over a period of 70 minutes, to grow the seed crystal to 0.513 μm.

This grain formation was followed by desalinization in accordance with the method described in Japanese Patent Application No. 41314/1991, after which gelatin was again dispersed, and the dispersion was adjusted to pH 5.80 and pAg 8.06 at 40° C. The thus-obtained emulsion grains had an average grain size of 0.513 μm, a distribution width of 28% and an average aspect ratio of 1.7.

Preparation of comparative emulsion EM-3

Emulsion EM-3 having an average grain size of 0.88 μm, a distribution width of 13% and an average aspect ratio of 1.7 was prepared in the same manner as for emulsion EM-1 except that the 33.7 ml methanol solution containing 0.001 mol of iodine was removed from solution A, and that grains were grown by simultaneously adding solutions B and C by the double jet method rather than by addition of solution E alone.

Preparation of comparative emulsion EM-4

Emulsion EM-4 having an average grain size of 0.515 μm, a distribution width of 29% and an average aspect ratio of 1.8 was prepared in the same manner as for emulsion EM-2 except that the 33.7 ml methanol solution containing 0.001 mol of iodine was removed from solution H.

Preparation of inventive emulsion EM-5

Emulsion EM-5 having an average grain size of 0.873 μm, a distribution width of 10% and an average aspect ratio of 1.5 was prepared in the same manner as for emulsion EM-1 except that seed emulsion T-1 for solution A was replaced with seed emulsion T-2.

Preparation of comparative emulsion EM-6

Emulsion EM-6 having an average grain size of 1.11 μm, a distribution width of 24% and an average aspect ratio of 3.2 (grains exceeding 3.0 in aspect ratio accounted for 95% of the total number of grains) was prepared in the same manner as for emulsion EM-1 except that pAg was changed as a function of time from 9.0 to 9.7 during crystal growth, and that the rates of additions of solutions B, C and D were changed according to the critical growth speeds at respective time points.

Preparation of comparative emulsion EM-7

Emulsion EM-7 having an average grain size of 0.875 μm, a distribution width of 8% and an average aspect ratio of 1.1 was prepared in the same manner as for emulsion EM-1 except that seed emulsion T-1 for solution A was replaced with a monodispersed emulsion comprising tetradecahedral normal crystal grains having an average grain size of 0.230 μm and containing 6 mol % silver iodide.

The thus-obtained emulsions EM-1 through EM-7 were each chemically ripened as described below to yield emulsions EM-A through EM-G.

Preparation of emulsion EM-A

A portion of emulsion EM-1 was dissolved at 50° C. After adsorption of the below-described sensitizing dyes S-6, S-7 and S-8, each in an amount of 50 mg, for 15 minutes, the solution was ripened with $1.0\times10^{-5}$ mol sodium thiosulfate pentahydrate, $3.6\times10^{-6}$ chloroauric acid and $5.0\times10^{-4}$ mol ammonium thiocyanate. The chloroauric acid and ammonium thiocyanate, together in a mixed solution, were added simultaneously with addition of the sodium thiosulfate pentahydrate. After ripening for an appropriate period of time, 4-hydroxy-6-methyl-1,3,3a,7-tetrazaindene, as a stabilizer, was added, followed by cool setting, to yield emulsion EM-A. Emulsions EM-2 through EM-7 were chemically ripened in the same manner as for emulsion EM-1 to yield emulsions EM-B through EM-G.

Preparation of sample coated with a single emulsion layer

Each of the thus-obtained emulsions EM-A through EM-G was coated and dried on a triacetyl cellulose film support, subbed with the following coating solution composition, to yield sample Nos. 101 through 107. In all examples given below, the amount of addition in silver halide photographic light-sensitive material is expressed in gram per $m^2$, unless otherwise stated. The figures for silver halide have been converted to the amounts of silver.

Coating solution compositions

The following layers (the chemical formulas of the compounds used are all given in Example 2) were sequentially coated in this order from the support side.

| Layer 1 | |
|---|---|
| Emulsion | 2.0 |
| Magenta coupler M-2 | 0.15 |
| High boiling solvent Oil-2 | 0.28 |
| Gelatin | 1.5 |
| Layer 2: Protective layer | |
| Gelatin | 1.0 |

In addition to these compositions, a coating aid Su-1, a dispersing agent Su-2 and a hardener H-1 were added to appropriate layers.

Each of the thus-obtained coated sample Nos. 101 through 107 was subjected to green light exposure through an optical wedge, after which it was processed as described below. From the characteristic curve, determinations were made of the relative sensitivity (expressed as the reciprocal of the exposure amount yielding a density equivalent to fogging+0.1), and the minimum exposure amount required to obtain the maximum density.

| Process (38° C.): | |
|---|---|
| Color development | 2 minutes 50 seconds |
| Bleaching | 6 minutes 30 seconds |
| Washing | 3 minutes 15 seconds |
| Fixation | 6 minutes 30 seconds |
| Washing | 3 minutes 15 seconds |
| Stabilization | 1 minute 30 seconds |
| Drying | |

The compositions of the processing solutions used in the respective processes are as follows:

| Color developer | |
|---|---|
| 4-amino-3-methyl-N-ethyl-N-(β-hydroxylethyl)aniline sulfate | 4.75 g |
| Anhydrous sodium sulfite | 4.25 g |
| Hydroxylamine.½ sulfate | 2.0 g |
| Anhydrous potassium carbonate | 37.5 g |
| Sodium bromide | 1.3 g |
| Trisodium nitrilotriacetate monohydrate | 2.5 g |
| Potassium hydroxide | 1.0 g |

Water was added to make a total quantity of 1 l, and the solution was adjusted to pH 10.0.

| Bleacher | |
|---|---|
| Ammonium iron ethylenediaminetetraacetate | 100 g |
| Diammonium ethylenediaminetetraacetate | 10.0 g |
| Ammonium bromide | 150.0 g |
| Glacial acetic acid | 10 ml |

Water was added to make a total quantity of 1 l, and aqueous ammonia was added to obtain a pH of 6.0.

| Fixer | |
|---|---|
| Ammonium thiosulfate | 175.0 g |
| Anhydrous sodium sulfite | 8.5 g |
| Sodium metasulfite | 2.3 g |

Water was added to make a total quantity of 1 l, and acetic acid was added to obtain a pH of 6.0.

| Stabilizer | |
|---|---|
| Formalin (37% aqueous solution) | 1.5 ml |
| Konidax (produced by Konica Corporation) | 7.5 ml |

Water was added to make a total quantity of 1 l.

To observe development starting points, each of coated sample Nos. 101 through 107 was subjected to exposure in an exposure amount 10 times the previously determined minimum exposure amount required to obtain the maximum density, after which it was processed as follows:

| Process (38° C.) | |
|---|---|
| Color development (10-fold dilution) | 30 seconds |
| Stopping | 1 minute |
| Washing | 3 minutes 15 seconds |
| Drying | |

The color developer had the same composition as of the processing solution used to draw the characteristic curve, but it was used after 10-fold dilution with water.

A 3% aqueous acetic acid solution was used as a stopping bath.

Each sample thus processed was treated with enzyme to decompose the gelatin, and silver halide grains were observed for development starting points by high-resolution scanning electron microscopy.

For each sample, all 400 to 500 development starting points were counted, and the ratio of development starting points in the cross area was calculated, provided that the cross area is a portion on the grain surface included within the sphere whose radius is 0.10 μm and whose center is the cross area center as defined in the foregoing. The results are given in Table 2.

TABLE 2

| Sample No. | 101 | 102 | 103 | 104 | 105 | 106 | 107 |
|---|---|---|---|---|---|---|---|
| Ratio (%) of development starting points within cross area | 83 | 80 | 63 | 58 | 73 | 82 | 0 |

From Table 2, it is seen that sample Nos. 101, 102, 105 and 106 are light-sensitive materials wherein the development starting point is present near the intersection of a line formed by a twin crystal plane exposed to the grain surface and a edge of the grain.

Example 2: Preparation of light-sensitive material samples

Using emulsions EM-1 through EM-7 after optimum gold-sulfur sensitization, layers of the following compositions were formed on a triacetyl cellulose film support in this order from the support side, to yield a multiple-layered color photographic light-sensitive material.

In all description below, the amount of addition in silver halide photographic light-sensitive material is expressed in gram per $m^2$, unless otherwise stated. The figures for silver halide and colloidal silver have been converted to the amounts of silver. The figures for sensitizing dyes are expresses as molar number per mol of silver halide.

The composition of multiple-layered color photographic light-sensitive material sample No. 201 (incorporating inventive emulsions EM-1 and EM-2) is as follows:

Sample Nos. 202 through 206 were prepared in the same manner as for sample No. 201 except that emulsion EM-2 in layer 7 and emulsion EM-1 in layer 8 were replaced with respective emulsions listed in Table 3.

TABLE 3

| Sample No. | Emulsion in layer 7 | Emulsion in layer 8 |
|---|---|---|
| 201 | EM-2 | EM-1 |
| 202 | EM-2 | EM-5 |
| 203 | EM-4 | EM-3 |
| 204 | EM-2 | EM-3 |
| 205 | EM-2 | EM-6 |
| 206 | EM-2 | EM-7 |

Sample No. 1 (comparative)

| | |
|---|---|
| Layer 1: Anti-halation layer HC | |
| Black colloidal silver | 0.16 g |
| UV absorbent UV-1 | 0.30 g |
| Gelatin | 1.70 g |
| Layer 2: First interlayer IL-1 | |
| Gelatin | 0.80 g |
| Layer 3: Low speed red-sensitive emulsion layer R-L | |
| Silver iodobromide emulsion (average grain size 0.36 μm) | 0.40 g |
| Sensitizing dye S-1 | $1.2 \times 10^{-4}$ (mol/mol silver) |
| Sensitizing dye S-2 | $0.2 \times 10^{-4}$ (mol/mol silver) |
| Sensitizing dye S-3 | $2.0 \times 10^{-4}$ (mol/mol silver) |
| Sensitizing dye S-4 | $1.2 \times 10^{-4}$ (mol/mol silver) |
| Cyan coupler C-1 | 0.33 g |
| Colored cyan coupler CC-1 | 0.05 g |
| High boiling solvent Oil-1 | 0.30 g |
| Gelatin | 0.55 g |
| Layer 4: Moderate speed red-sensitive emulsion layer R-M | |
| Silver iodobromide emulsion (average grain size 0.51 μm) | 0.48 g |
| Sensitizing dye S-1 | $1.5 \times 10^{-4}$ (mol/mol silver) |
| Sensitizing dye S-2 | $0.2 \times 10^{-4}$ (mol/mol silver) |
| Sensitizing dye S-3 | $2.5 \times 10^{-4}$ (mol/mol silver) |
| Sensitizing dye S-4 | $1.5 \times 10^{-4}$ (mol/mol silver) |
| Cyan coupler C-1 | 0.30 g |
| Colored cyan coupler CC-1 | 0.05 g |
| DIR compound D-1 | 0.03 g |
| High boiling solvent Oil-1 | 0.40 g |
| Gelatin | 0.60 g |
| Layer 5: High speed red-sensitive emulsion layer R-H | |
| Silver iodobromide emulsion (average grain size 0.74 μm) | 0.66 g |
| Sensitizing dye S-1 | $1.0 \times 10^{-4}$ (mol/mol silver) |
| Sensitizing dye S-2 | $0.2 \times 10^{-4}$ (mol/mol silver) |
| Sensitizing dye S-3 | $1.7 \times 10^{-4}$ (mol/mol silver) |
| Sensitizing dye S-4 | $1.0 \times 10^{-4}$ (mol/mol silver) |
| Cyan coupler C-2 | 0.10 g |
| Colored cyan coupler CC-1 | 0.01 g |
| DIR compound D-1 | 0.02 g |
| High boiling solvent Oil-1 | 0.15 g |
| Gelatin | 0.53 g |
| Layer 6: Second interlayer IL-2 | |
| Gelatin | 0.80 g |
| Layer 7: Low speed green-sensitive emulsion layer G-L | |
| Silver iodobromide emulsion EM-2 | 0.60 g |

TABLE 3-continued

| | |
|---|---|
| Silver iodobromide emulsion (average grain size 0.36 μm) | 0.40 g |
| Sensitizing dye S-1 | $0.6 \times 10^{-4}$ (mol/mol silver) |
| Sensitizing dye S-5 | $5.1 \times 10^{-4}$ (mol/mol silver) |
| Magenta coupler M-1 | 0.55 g |
| Colored magenta coupler CM-1 | 0.17 g |
| DIR compound D-2 | 0.03 g |
| High boiling solvent Oil-2 | 0.70 g |
| Gelatin | 1.56 g |
| Layer 8: High speed green-sensitive emulsion layer G-H | |
| Silver iodobromide emulsion EM-1 | 0.60 g |
| Sensitizing dye S-6 | $1.5 \times 10^{-4}$ (mol/mol silver) |
| Sensitizing dye S-7 | $1.5 \times 10^{-4}$ (mol/mol silver) |
| Sensitizing dye S-8 | $1.5 \times 10^{-4}$ (mol/mol silver) |
| Magenta coupler M-1 | 0.06 g |
| Magenta coupler M-2 | 0.02 g |
| Colored magenta coupler CM-2 | 0.02 g |
| DIR compound D-3 | 0.002 g |
| High boiling solvent Oil-2 | 0.15 g |
| Gelatin | 0.45 g |
| Layer 9: Yellow filter layer YC | |
| Yellow colloidal silver | 0.12 g |
| Additive HS-1 | 0.20 g |
| Additive HS-2 | 0.14 g |
| High boiling solvent Oil-2 | 0.18 g |
| Gelatin | 0.80 g |
| Layer 10: Low speed blue-sensitive emulsion layer B-L | |
| Silver iodobromide emulsion (average grain size 0.51 μm) | 0.18 g |
| Silver iodobromide emulsion (average grain size 0.36 μm) | 0.35 g |
| Sensitizing dye S-9 | $5.1 \times 10^{-4}$ (mol/mol silver) |
| Sensitizing dye S-10 | $2.0 \times 10^{-4}$ (mol/mol silver) |
| Yellow coupler Y-1 | 0.58 g |
| Yellow coupler Y-2 | 0.30 g |
| High boiling solvent Oil-2 | 0.15 g |
| Gelatin | 1.20 g |
| Layer 11: High speed blue-sensitive emulsion layer B-H | |
| Silver iodobromide emulsion (average grain size 0.88 μm) | 0.45 g |
| Sensitizing dye S-9 | $2.8 \times 10^{-4}$ (mol/mol silver) |
| Sensitizing dye S-10 | $1.0 \times 10^{-4}$ (mol/mol silver) |
| Yellow coupler Y-1 | 0.10 g |
| High boiling solvent Oil-2 | 0.04 g |
| Gelatin | 0.50 g |
| Layer 12: First protective layer Pro-1 | |
| Silver iodobromide emulsion (average grain size 0.04 μm) | 0.30 g |
| UV absorbent UV-2 | 0.07 g |
| UV absorbent UV-3 | 0.10 g |
| Additive HS-1 | 0.25 g |
| High boiling solvent Oil-2 | 0.07 g |
| High boiling solvent Oil-3 | 0.07 g |
| Gelatin | 0.80 g |
| Layer 13: Second protective layer Pro-2 | |
| Alkali-soluble matting agent having an average grain size of 2 μm | 0.13 g |
| Polymethyl methacrylate having an average grain size of 3 μm | 0.02 g |
| Gelatin | 0.50 g |

In addition to these compositions, a coating aid Su-1, a dispersing agent Su-2, hardeners H-1 and H-2 and dyes AI-1 and AI-2 were added to appropriate layers.

C-1
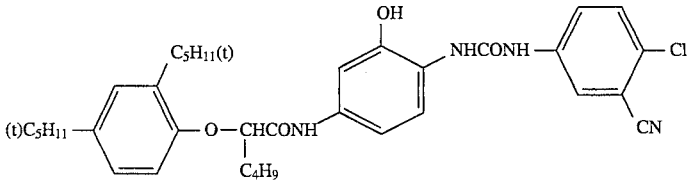
C-2
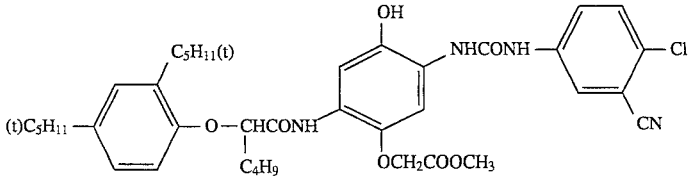
M-1
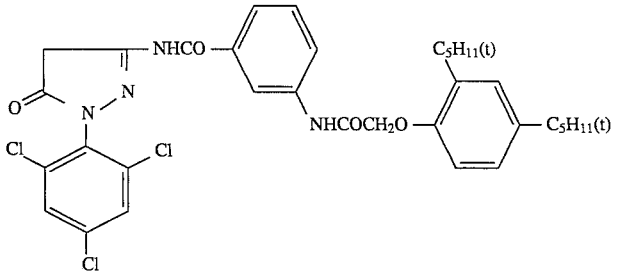
M-2
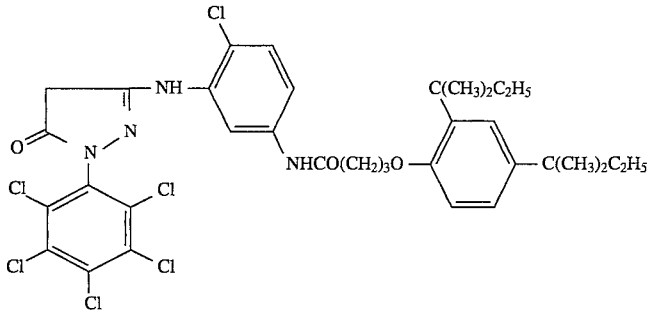
Y-1
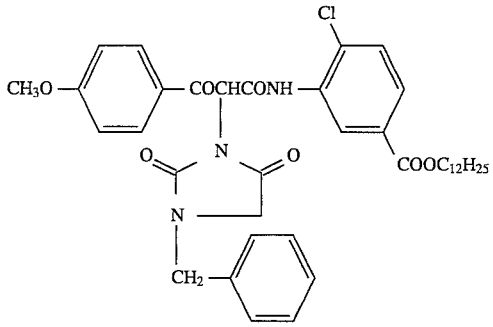
Y-2
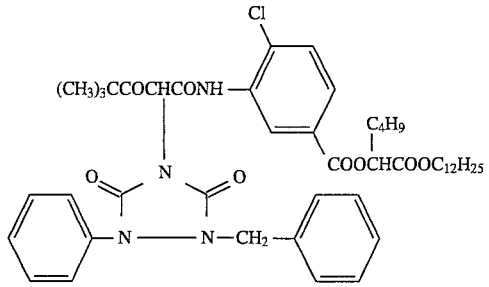

-continued
CC-1
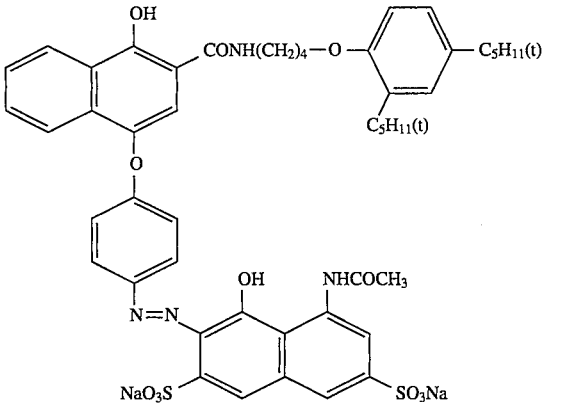
CM-1
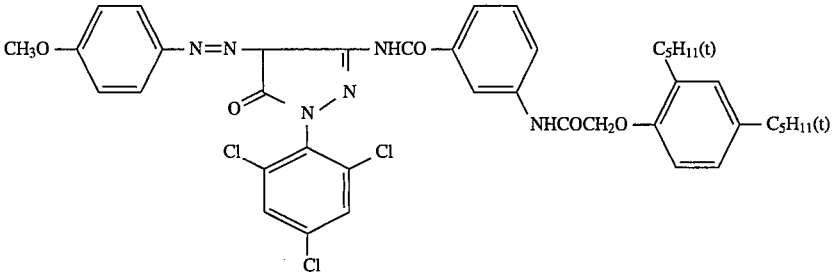
CM-2
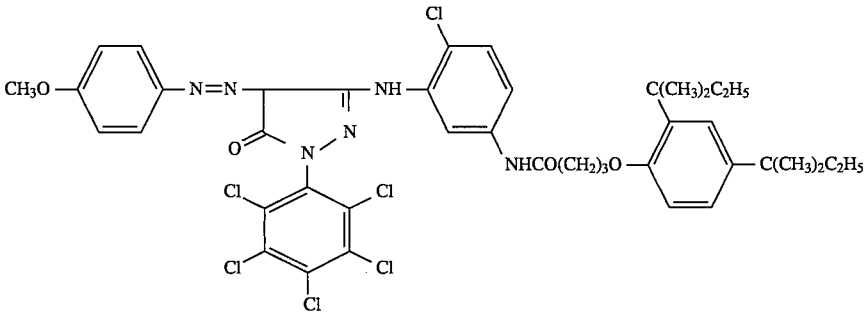
D-1
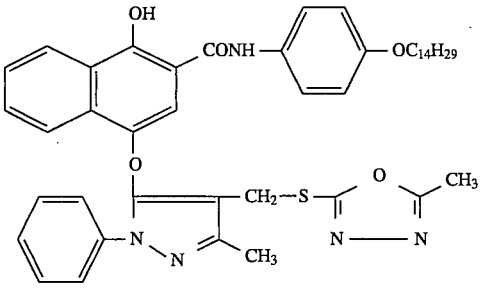
D-2
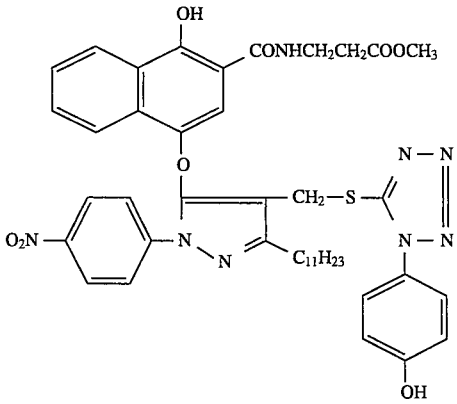

-continued
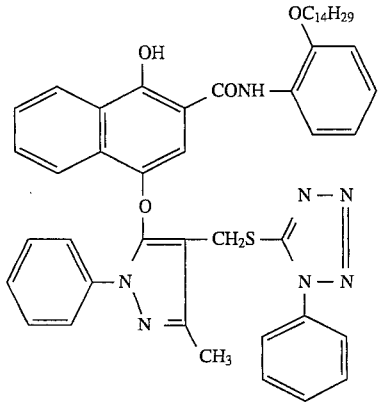
D-3
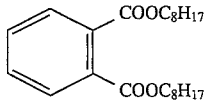
Oil-1
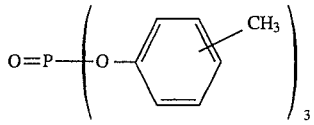
Oil-2
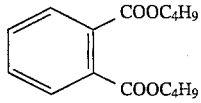
Oil-3
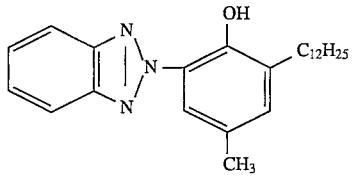
UV-1
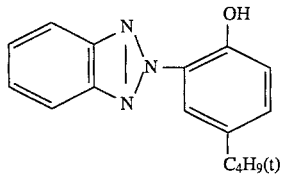
UV-2
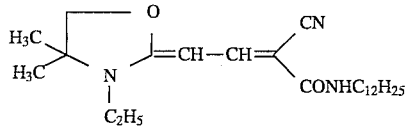
UV-3
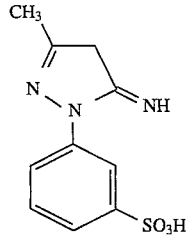
HS-1

-continued
HS-2
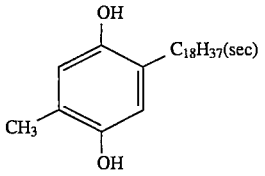
SU-1
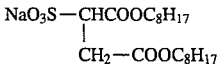
SU-2
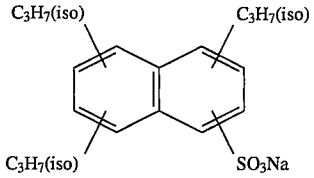
H-1
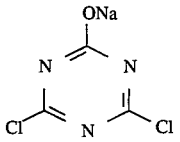
H-2
$(CH_2{=}CHSO_2CH_2)_2O$
AI-1
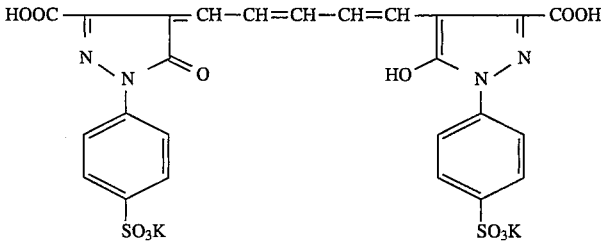
AI-2
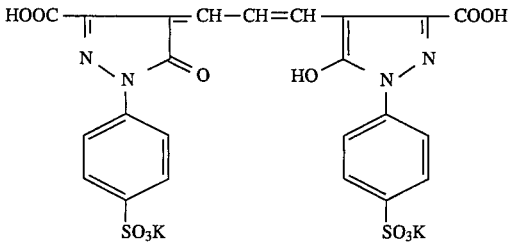
S-1
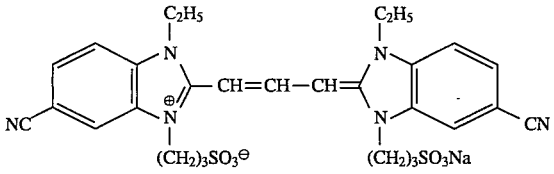
S-2
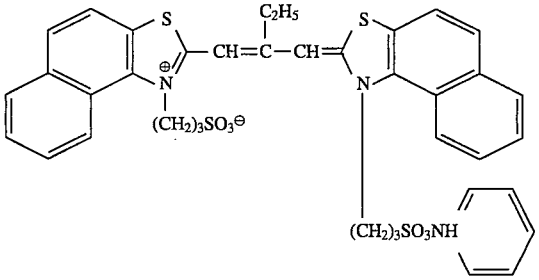

-continued

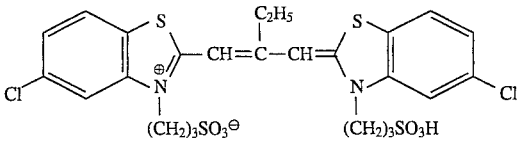

S-3

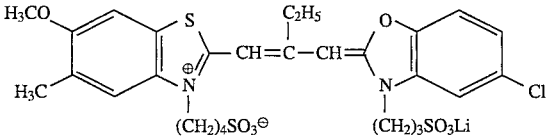

S-4

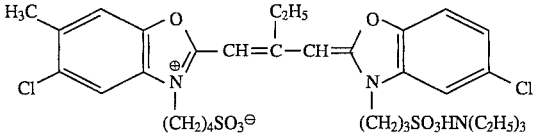

S-5

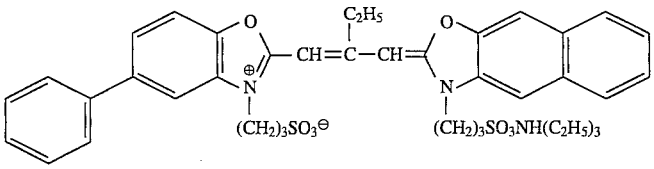

S-6

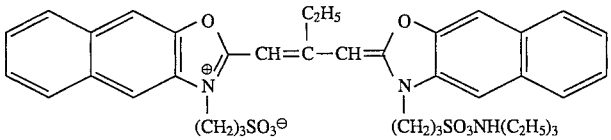

S-7

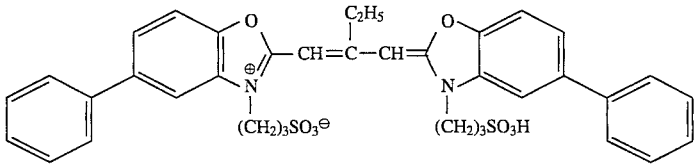

S-8

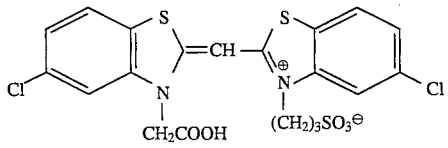

S-9

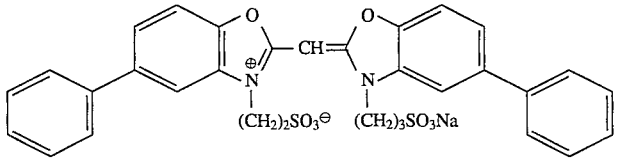

S-10

Evaluation of color photographic light-sensitive material samples

Each of the thus-prepared samples was evaluated as to relative sensitivity, granularity, processing variability and IIE.

Evaluation of relative sensitivity

After green light (G) exposure through an optical wedge, each sample was processed as shown in Table 4 below. The developer had a pH value of 10.1 (processing 1).

Relative sensitivity, or the reciprocal of the exposure amount yielding a density equivalent to $D_{min}$+0.15, is expressed in percent ratio relative to the green light sensitivity of sample No. 206. The results are given in Table 5.

Relative sensitivity increases as this value increases.

Evaluation of granularity

After exposure and development in the same manner as for the evaluation of relative sensitivity, granularity was determined by scanning the subject portion of a density of $D_{min}$+0.15 in each sample, using a microdensitometer with an opening scanning area of 25 $\mu m^2$, and obtained results are expressed as standard deviation (RMS value) for density variance in percent ratio, relative to the value from sample No. 106. The results are given in Table 5. Granularity increases as this value decreases.

Evaluation of processing variability

After white light exposure through an optical wedge, each of silver halide color photographic light-sensitive material sample Nos. 201 through 206 was processed as directed in Table 4 below. Also, to assess stability to pH fluctuation in the developer, color developers of different pH values were used.

TABLE 4

| Procedure | Processing time | Processing temperature (°C.) | Amount of replenisher (ml) |
|---|---|---|---|
| Color development | 3 minutes 15 seconds | 38 ± 0.3 | 780 |
| Bleaching | 6 minutes 30 seconds | 38 ± 2.0 | 150 |
| Washing | 3 minutes 15 seconds | 20 ± 10 | 200 |
| Fixation | 6 minutes 30 seconds | 38 ± 2.0 | 830 |
| Washing | 3 minutes 15 seconds | 20 ± 10 | 200 |
| Stabilization | 1 minute 30 seconds | 38 ± 5.0 | 830 |
| Drying | 2 minutes | 55 ± 5.0 | — |

In FIG. 4, the amount of replenisher is given per $m^2$ of photographic light-sensitive material.

The color developer, bleacher, fixer, stabilizer and replenishers therefor were prepared as follows:

| Color developer | |
|---|---|
| 4-amino-3-methyl-N-ethyl-N-(β-hydroxyethyl)aniline sulfate | 4.75 g |
| Anhydrous sodium sulfite | 4.25 g |
| Hydroxylamine 1/2 sulfate | 2.0 g |
| Anhydrous potassium carbonate | 37.5 g |
| Sodium bromide | 1.3 g |
| Trisodium nitrolotriacetate monohydrate | 2.5 g |
| Potassium hydroxide | 1.0 g |

Water was added to make a total quantity of 1 l, and the solution was adjusted to pH 10.1 (processing 1) or pH 9.9 (processing 2).

| Bleacher | |
|---|---|
| Ammonium iron (III) ethylenediaminetetraacetate | 100.0 g |
| Diammonium ethylenediaminetetraacetate | 10.0 g |
| Ammonium bromide | 150.0 g |
| Glacial acetic acid | 10.0 ml |

Water was added to make a total quantity of 1 l, and aqueous ammonia was added to obtain a pH of 6.0.

| Fixer | |
|---|---|
| Ammonium thiosulfate | 175.0 g |
| Anhydrous sodium sulfite | 8.5 g |
| Sodium metasulfite | 2.3 g |

Water was added to make a total quantity of 1 l, and acetic acid was added to obtain a pH of 6.0.

| Stabilizer | |
|---|---|
| Formalin (37% aqueous solution) | 1.5 ml |
| Konidax (produced by Konica Corporation) | 7.5 ml |

Water was added to make a total quantity of 1 l.

| Color developer replenisher | |
|---|---|
| Water | 800 ml |
| Potassium carbonate | 35 g |

-continued

| Color developer replenisher | |
|---|---|
| Potassium hydrogen carbonate | 3 g |
| Potassium sulfite | 5 g |
| Sodium bromide | 0.4 g |
| Hydroxylamine sulfate | 3.1 g |
| 4-amino-3-methyl-N-ethyl-N-(β-hydroxylethyl)aniline sulfate | 6.3 g |
| Potassium hydroxide | 2 g |
| Diethylenetriaminepentaacetic acid | 3.0 g |

Water was added to make a total quantity of 1 l, and potassium hydroxide or 20% sulfuric acid was added to obtain a pH of 10.18.

| Bleacher replenisher | |
|---|---|
| Water | 700 ml |
| Ammonium iron (III) 1,3-diaminopropanetetraacetate | 175 g |
| Ethylene diaminetetraacetic acid | 2 g |
| Sodium nitrate | 50 g |
| Ammonium bromide | 200 g |
| Glacial acetic acid | 56 g |

After aqueous ammonia or glacial acetic acid was added to obtain a pH of 4.0, water was added to make a total quantity of 1 l.

| Fixer replenisher | |
|---|---|
| Water | 800 ml |
| Ammonium thiocyanate | 150 g |
| Ammonium thiosulfate | 180 g |
| Sodium sulfite | 20 g |
| Ethylenediaminetetraacetic acid | 2 g |

After aqueous ammonia or glacial acetic acid was added to obtain a pH of 6.5, water was added to make a total quantity of 1 1.

Stabilizer replenisher

The same as of the stabilizer.

Evaluation of processing stability

Magenta color stability to pH change was determined from the sensitometric curve variation width and the width of difference $\Delta\gamma$of $\gamma_B$ in processing 1 (pH 10.1) from $\gamma_A$ in processing 2 (pH 9.9) (see the following equation).

$$\Delta\gamma=[(\gamma_B-\gamma_A]\times 100\ (\%)$$

The results are given in Table 5. Stability increases as the value for $\Delta\gamma$decreases.

Evaluation of IIE

Each sample was uniformly exposed to green light and then subjected to red light exposure through an optical wedge, after which it was processed by the above processing 1. In FIG. 1, the curve $A_1$–$B_1$ is a characteristic curve for red-sensitive layer cyan dye images, the curve $A_2$–$B_2$ representing the magenta dye image density of the green-sensitive layer after uniform exposure to green light. P indicates a cyan dye image fog density (or minimum density) portion; Q represents an exposure amount (P+1.5) for a cyan dye density equivalent to fog density+Δb.

The difference between magenta dye image density $A_2$ at exposure amount P and magenta dye image density $B_2$ at exposure amount Q is expressed in the notation of Δa. In terms of the ratio (Δa/Δb) of magenta dye image density to cyan dye image density, the IIE of the red-sensitive layer on the green-sensitive layer was determined in percent ratio relative to the IIE value of sample No. 206. The results are given in Table 5. IIE improves as this value increases.

TABLE 5

| Sample | Relative sensitivity (S) | Granularity (G) | Processing stability (Δγ) | IIE (R → G) |
|---|---|---|---|---|
| 201 (inventive) | 160 | 88 | 17 | 120 |
| 202 (inventive) | 150 | 83 | 18 | 115 |
| 203 (comparative) | 140 | 90 | 23 | 103 |
| 204 (comparative) | 145 | 89 | 22 | 108 |
| 205 (comparative) | 150 | 115 | 27 | 115 |
| 206 (comparative) | 100 | 100 | 26 | 100 |

From Table 5, it is seen that light-sensitive material sample Nos. 201 and 202, both prepared according to the present invention, offered improvements in processing stability and IIE without affecting the good balance between sensitivity and granularity.

Example 3

Photographic material samples 301 through 308 were prepared in the same manner as in sample 203 of Example 2, except that emulsions of layers 3 to 5 were replaced with respective silver halide emulsions listed in Table 6. Thus prepared samples were subjected to exposure and processing, and evaluated in the same manner as in Example 2. Results thereof are given in Table 7.

TABLE 6

| Sample No. | Emulsion in layer 3 | Emulsion in layer 4 | Emulsion in layer 5 |
|---|---|---|---|
| 301 (inventive) | EM-2 | EM-2 | EM-1 |
| 302 (inventive) | EM-2 | EM-2 | EM-5 |
| 303 (inventive) | EM-2 | EM-2 | EM-3 |
| 304 (inventive) | EM-2 | EM-4 | EM-1 |
| 305 (inventive) | EM-4 | EM-2 | EM-1 |
| 306 (comparative) | EM-4 | EM-2 | EM-3 |
| 307 (comparative) | EM-4 | EM-2 | EM-3 |
| 308 (comparative) | EM-2 | EM-4 | EM-3 |
| 309 (comparative) | EM-4 | EM-4 | EM-3 |

TABLE 7

| Sample | Relative sensitivity (S) | Granularity (G) | Processing stability (Δγ) | IIE (R → G) |
|---|---|---|---|---|
| 301 (inventive) | 170 | 87 | 16 | 126 |
| 302 (inventive) | 160 | 82 | 17 | 120 |
| 303 (inventive) | 150 | 85 | 18 | 118 |
| 304 (inventive) | 163 | 87 | 18 | 122 |
| 305 (inventive) | 163 | 88 | 17 | 119 |
| 306 (comparative) | 160 | 100 | 24 | 107 |
| 307 (comparative) | 150 | 95 | 23 | 105 |
| 308 (comparative) | 153 | 93 | 25 | 104 |
| 309 (comparative) | 100 | 100 | 23 | 100 |

TABLE 7-continued

| Sample | Relative sensitivity (S) | Granularity (G) | Processing stability (Δγ) | IIE (R → G) |
|---|---|---|---|---|

*: Inter-image effect of from green-sensitive layers to red-sensitive layers.

As can be seen from the tables, inventive samples 301 through 305 achieved improvements in processing stability and IIE without deteriorating sensitivity and granularity.

Example 4

Photographic material sample 401 was prepared in the same manner as in sample 201 of Example 2, except that the emulsions in layer 3 and 4 were replaces with emulsion EM-2, and the emulsion in layer 5 was replaced with emulsion EM-1. Thus prepared sample was subjected to exposure and processing, and evaluated in the same manner as in Example 2. Similarly as shown in sample 201 and 301, improved results were achieved.

What is claimed is:

1. A silver halide color photographic light-sensitive material comprising a support having thereon a red-sensitive layer, a green-sensitive layer and a blue-sensitive layer, at least one of which layers comprises two or more silver halide emulsion layers different in sensitivity from each other, wherein said two or more silver halide emulsion layers each contain a silver halide emulsion meeting the following requirements (i), (ii) and (iii):

(i) a monodispersed emulsion (ii) an emulsion containing silver halide grains having two parallel twin planes and an average aspect ratio of less than 3.0

(iii) an emulsion containing silver halide grains having a developing starting point, at least 70% of total development starting points of the grains locating at the intersection of a line formed by a twin plane exposed to the grain surface and an edge of the grain, or in the vicinity of the intersection.

2. The color photographic material of claim 1, wherein said monodispersed emulsion has a coefficient of variation of 20%.

3. The color photographic material of claim 1, wherein in (iii), said development starting points locate on the grain surface included within a sphere whose radius is ⅓ of the grain thickness and whose center is the intersection.

4. The color photographic material of claim 1, wherein said silver halide emulsion meeting requirements (i), (ii), and (iii) is formed in the presence of an oxidizing agent.

5. The color photographic material of claim 4, wherein said oxidizing agent is iodine.

6. The color photographic material of claim 1 wherein silver halide grains contained in the emulsion meeting requirements (ii) and (iii) comprise at least two layers having different silver iodide contents, an inner layer containing a maximum silver iodide content.

7. The color photographic material of claim 6, wherein the outermost layer of the grains is formed by supplying a silver halide fine grain emulsion.

* * * * *